Figure 1:
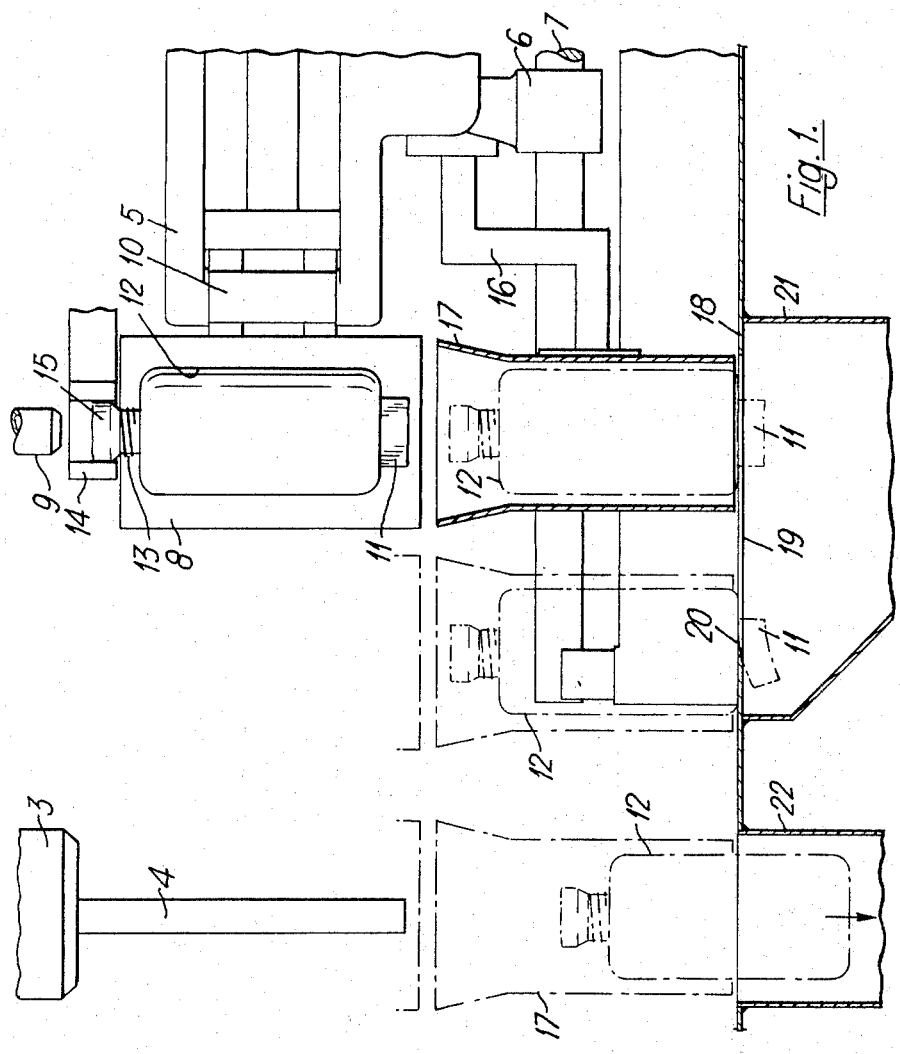

United States Patent [19]
Worthington

[11] 3,820,932
[45] June 28, 1974

[54] BLOW MOULDING
[75] Inventor: Victor Worthington, Wokingham, England
[73] Assignee: Bone Cravens Limited, Yorkshire, England
[22] Filed: Mar. 29, 1972
[21] Appl. No.: 239,041

[30] Foreign Application Priority Data
Apr. 6, 1971  Great Britain...................... 8859/71

[52] U.S. Cl. 425/302 B, 425/326 B, 425/DIG. 806, 425/DIG. 213
[51] Int. Cl.............................................. B29d 23/03
[58] Field of Search....... 425/806, DIG. 212, 302 B, 425/326 B, 387 B, DIG. 203, DIG. 206, DIG. 213

[56] References Cited
UNITED STATES PATENTS
3,003,187  10/1961  Schaich..................... 425/DIG. 212
3,351,981  11/1967  Rupert........................... 425/806 X
3,464,084  9/1969  Thompson...................... 425/806 X FOREIGN PATENTS OR APPLICATIONS
1,140,911  1/1969  Great Britain

*Primary Examiner*—Richard B. Lazarus
*Attorney, Agent, or Firm*—Brisebois & Kruger

[57] ABSTRACT

The invention is concerned with the removal of flash from the flat bottom of a hollow blow moulded article. The moulded article drops base first from a sectional mould in which it has been moulded onto a supporting surface having a slot into which the flash projects. The bottle is moved relatively to the supporting surface so that the flash is sheared off by a stationary knife at the end of the slot.

2 Claims, 2 Drawing Figures

BLOW MOULDING

The invention is concerned with a blow moulding machine of the kind (hereinafter referred to as of the kind described) having at least one mould carrier carrying a sectional mould, in which a tubular extruded parison of thermoplastics material is, in use, enclosed. The parison while soft is expanded to conform to the internal shape of the mould by fluid pressure applied through one end of the mould, to produce an article having a substantially flat base at the other end of the mould. Since one end of the parison will have been trapped between the sections at the other end of the mould, a certain amount of scrap flash will be attached to the undersurface of the base of the article.

The removal of this flash is a conventional problem which has been met in various ways. For example separate gripping devices have been provided on the sectional mould for tearing off this flash after the article has been moulded. Alternatively rotary cutting wheels have been given a movement relatively to the base of the moulded article to pare off the flash. These solutions, although acceptable to some extent, have all involved separate drives and the need for continual and precise adjustment of the parts relatively to the article.

In accordance with the present invention, in the operation of a blow moulding machine of the kind described, the flash on the substantially flat base of the article is removed by allowing the moulded article to drop base first from the sectional mould, after the mould has opened, onto a supporting surface having a slot into which the flash projects whilst the base of the article rests on the supporting surface, and providing relative lateral movement between the article and the supporting surface so that the article moves along above the slot until the flash is cut off by a stationary knife forming an end of the slot substantially at the level of the supporting surface.

The invention also includes a blow moulding machine of the kind described in which a supporting surface having a slot and a stationary knife forming an end of the slot is provided beneath the mould carrier, and means are provided for producing relative movement along the slot between the supporting surface and a moulded article which has dropped, in use, from a mould, mounted on the mould carrier, onto the supporting surface.

If there is a single mould carrier operating in a fixed position, the supporting surface may be laterally movable. Preferably however the invention is applied to a machine of the kind in which the or each mould carrier reciprocates to and fro substantially horizontally between a position beneath a parison extrusion head and a position beneath a blowing and/or filling head. In this case the supporting surface may be fixed and the article which has fallen from the mould may be moved over the supporting surface by the movement of the mould carrier.

In either case some lateral support must be provided for the article resting on the supporting surface to maintain the article upright and to prevent it from remaining in a fixed position relatively to the supporting surface. This lateral support may conveniently be provided by a chute mounted on the mould carrier immediately above the supporting surface and arranged to receive an article dropping from the open mould.

A convenient controlled discharge for the articles, the bases of which have been deflashed according to the invention, may be achieved by providing in the supporting surface, to the side of the knife remote from the slot, an aperture at least as large as the plan cross-section of the article so that by continuing the relative movement between the article and the supporting surface, the article will fall through the aperture into a collecting vessel, or perhaps onto a conveyor.

We are particularly interested in the application of the invention to a machine, such as that forming the subject of our British Pat. No. 1,140,911, which automatically and in sequence blow moulds, fills and seals thermoplastic containers, such as bottles. The filled containers will be considerably heavier than empty hollow blow moulded articles and consequently it is believed that they will sit under their own weight on the supporting surface during the relative movement in which the flash on the bottom of the container is cut off by the knife. Conversely when the invention is applied to a machine making unfilled containers, or other hollow blow moulded articles, the weight of the article may be insufficient to hold the article steady when the flash is cut off, and in this case some additional means may be necessary for holding the articles down against the supporting surface.

Figure 2:
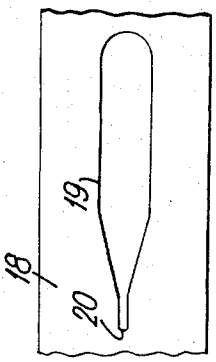

One example of a machine constructed in accordance with the present invention is illustrated in the accompanying drawings, in which:

FIG. 1 is a partly sectional diagrammatic front elevation showing the parts in different operating positions; and, FIG. 2 is a plan of part of a supporting plate.

The illustrated machine may be considered to be a modification of the machine forming the subject matter of our British Pat. No. 1,140,911. The machine has an extrusion head 3 which continuously extrudes a tube of soft thermoplastic material 4. A mould carrier 5 reciprocates to and fro horizontally guided by brackets 6 which slide on fixed guide rods 7 between a first position in which a two part sectional mould 8 is located beneath the extrusion head 3 and a position in which the mould is positioned beneath a blowing and filling mandrel 9. The mould sections are carried from the mould carrier 5 through a vertical pivot 10 and can be swung towards and away from one another to close and open the mould respectively by means of rams mounted on the mould carrier 5.

In operation the mould carrier is moved to the left as seen in FIG. 1 with the mould 8 open until the mould is beneath the extrusion head 3 whereupon the mould is closed to rap a length of the tube 4 within the mould. As the mould closes it traps the lower end of the section of tube 4 between its walls to seal the lower end of the tubular section and produce what subsequently appears as a flash portion 11 attached to the moulding. The mould carrier 5 then moves back to the other position in which the mould 8 is beneath the mandrel 9 and the mandrel 9 is inserted into the upper open end of the mould. The mandrel 9, which may be as that described in British Pat. No. 1,140,911, then causes a stream of fluid such as air, to be blown into the tubular section enclosed in the mould to expand the section to the internal configuration of the mould and form in this case a bottle 12 which may have an externally screw-threaded neck 13. The air supply is then discontinued and fluent contents with which the bottle are to be filled are then fed into the bottle through a separate passage in the mandrel 9, whilst allowing the air in the bottle to vent against a controlled back pressure. It would be possible under some circumstances for the tubular section to be expanded by fluid which itself forms the fluent contents with which the bottle will then remain filled. The bottle neck is then sealed by means of auxiliary sealing jaws 14 which squeeze the upper end 15 of the tubular section to form a heat seal.

It would be possible to omit the step of filling the bottle with fluent contents, and the blowing and filling may be carried out by separate mandrels at different positions. As envisaged in British Pat. No. 1,140,911, two or more mould carriers may operate in conjunction with a single extrusion head 3, each mould carrier bringing its mould in turn beneath the extrusion head to receive a length of the extruded tube 4, and beneath its own mandrel 9.

The invention is concerned with the manner of removing the flash 11 from the flat bottom of the bottle 10. For this purpose the mould carrier 5 supports by means of an arm 16 an upright open ended chute 17 which reciprocates with the mould carrier 5 just above the level of a supporting surface formed by a fixed plate 18. The plate 18 is formed with a slot 19 the shape of which is apparent from FIG. 2 and the left hand end of the slot as seen in FIG. 1 is formed by a sharp knife edge 20 produced by an under cut chamfer in the material of the plate 18. A hopper 21 is attached to the underside of the plate 18 beneath the slot 19 and, in a position in alignment with the extrusion head 3, the plate 18 has an aperture beneath which is mounted a chute 22.

When the bottle 12 has been expanded, filled and sealed, the mould 8 is opened so that the bottle is supported by the sealing jaws 14. These jaws are then opened allowing the bottle to fall from the open mould into the chute 17 until the base of the bottle 12 rests on the plate 18 with the flash 11 extending down through the slot 19. The mould carrier 5 then commences its movement to the left as seen in FIG. 1 to collect a further section of tube 4 and as it does so the chute 17 carries the bottle with it. As the flash 11 reaches the knife edge 20 at the end of the slot 19 it is sheared off flush with the lower surface of the bottle 12 and the piece of flash 11 drops into the hopper 21. As the mould carrier 5 completes its movement to the left the chute 17 comes over the chute 22 and the bottle 12 falls from the chute 17 through the chute 22.

The chute 22 may be positioned above a conveyor onto which the bottle falls and along which the bottle is carried for subsequent treatment. If it is desired to remove flash from the sealed neck of the bottle automatically, rotating cutter may be provided adjacent to the conveyor so that as the bottles are carried along the conveyor they are successively and automatically manipulated relatively to the rotating cutter to pare off the flash from the neck.

I claim:

1. A blow moulding machine comprising:
   at least one sectional mould,
   first and second stations comprising means for producing a tubular extruded parison of thermoplastics material for enclosure within said mould at said first station, and means for applying fluid pressure through one end of said mould to expand said parison therein and produce a moulded article conforming to the internal shape of the mould and having a depending flash at said second station,
   a mould carrier for reciprocating said mould in a substantially horizontal plane between said first and second stations, said carrier comprising means for opening said mould while at said second station to release said article,
   a stational supporting surface beneath said second station and vertically spaced therefrom, said surface having a slot therein dimensioned to receive said flash,
   guide means connected to said mould carrier so as to be moved relative to said supporting surface as said carrier reciprocates, and positioned, when said carrier means has said mould at said second station, to guide a moulded article released at said second station downwardly until it rests on said stationary plate with said flash projecting into the slot in said plate, and
   a stationary knife forming one end of said slot which cuts off said flash when said carrier means moves said mould from said second station to said first station, and thereby produces relative movement between said guide means and supporting surface.

2. A machine according to claim 1, wherein there is provided in said supporting surface, to the side of said knife remote from said slot, an aperture at least as large as the plan area of said moulded article, and said mould carrier being adapted to move said article over said supporting surface beyond said knife until said article registers with said aperture.

* * * * *